(12) United States Patent
Freker et al.

(10) Patent No.: US 7,230,627 B2
(45) Date of Patent: Jun. 12, 2007

(54) OPTIMIZED MEMORY ADDRESSING

(75) Inventors: David E. Freker, Sacramento, CA (US); Aditya Sreenivas, El Dorado Hills, CA (US); Zohar Bogin, Folsom, CA (US); Anoop Mukker, Folsom, CA (US); Tuong Trieu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 10/796,686

(22) Filed: Mar. 8, 2004

(65) Prior Publication Data

US 2005/0195202 A1 Sep. 8, 2005

(51) Int. Cl.
*G09G 5/399* (2006.01)
*G09G 5/39* (2006.01)
*G06F 13/00* (2006.01)

(52) U.S. Cl. .................. 345/540; 345/531; 345/536; 345/537

(58) Field of Classification Search ................ 345/531, 345/535–540, 532, 533; 711/5, 157
See application file for complete search history.

(56) References Cited

U.S. PATENT DOCUMENTS 6,469,703 B1 * 10/2002 Aleksic et al. .............. 345/542

* cited by examiner

*Primary Examiner*—Kee M. Tung
*Assistant Examiner*—Hau Nguyen
(74) *Attorney, Agent, or Firm*—Blakely, Sokoloff, Taylor & Zafman LLP

(57) ABSTRACT

Embodiments of the present invention relate to accessing a first pair of adjacent data blocks using a first channel of a dual channel memory device; and simultaneously accessing a second pair of adjacent data blocks using a second channel of the memory device, the second pair being spaced apart from the first pair by a predetermined interval.

25 Claims, 4 Drawing Sheets

//]: #

OPTIMIZED MEMORY ADDRESSING

FIELD

Embodiments of the present invention relate to accessing memory and, in particular, to an addressing mode to optimize memory access for high speed operations.

BACKGROUND

Address mapping can have a significant impact on the rate at which the mapped data can be accessed for read and write operations. As an example, in a DDR (Double Data Rate) SDRAM (Synchronous Dynamic Random Access Memory) interface of a core logic chipset for supporting a CPU (Central Processing Unit) of a computing platform, there can be two channels of memory. Data is interleaved across the channels on a quadword basis.

Each memory channel is a quadword (QW) wide. A quadword is four words and a word is two bytes, so a quadword is eight consecutive bytes of data. This is a typical organization for a dual channel memory subsystem for a CPU supporting a 64-bit bus. Typically, as an agent reads or writes, walking through memory, it alternates from one channel to the other. So, for example, QW0 is from channel A and QW1 is from channel B. QW2 is from channel A and QW3 is from channel B. This alternating memory map optimizes memory access speed for a connected CPU because it minimizes the effects of delays within the SDRAM modules. It also provides the quadwords in an order that is typically the best order for the CPU. QWs 0 and 1 are fetched first and these are typically the first quadwords that the CPU wants.

These two channels of memory with this alternating mapping can be used to interface external memory to any of the devices coupled to or integrated on the chipset. While this mapping may be optimal for a CPU, it is far less than optimal for some of the other possible connected or integrated components. An integrated graphics controller typically also requests data in pairs of two QWs.

An integrated graphics controller can request a pair of QWs at one address and another pair of QWs 64, 128 or 256 bytes away from the first pair. The traditional organization in which consecutive QWs are interleaved across channels prevents full use of the available memory access bandwidth for such requests.

BRIEF DESCRIPTION OF THE DRAWINGS

Embodiments of the present invention will be understood more fully from the detailed description given below and from the accompanying drawings of various embodiments of the invention. The drawings, however, should not be taken to be limiting, but are for explanation and understanding only.

DETAILED DESCRIPTION

Embodiments of the invention are described herein as part of the DDR (double Data Rate) SDRAM interface of a core logic chipset such as an Intel® 865 or 875 chipset. However, embodiments of the invention are not limited to such applications. In the described embodiments, address mapping to the memory interface is optimized for bandwidth for an integrated graphics controller, that is, a graphics controller which is integrated in the chipset and uses two channels of memory. Such a graphics controller generally requests a pair of QWs at one address and another pair 64, 128 or 256 bytes away from the first pair. The address mapping of the described embodiments allows such requests to be handled simultaneously by the memory controller. As a result, such accesses can utilize the full memory bandwidth.

In some embodiments, there may be some small impact on performance for cycles from the CPU but the bandwidth realized for the graphics accesses far outweighs this effect. The address mapping allows for much higher bandwidth for the graphics controller and accordingly higher graphics controller performance.

Figure 1:
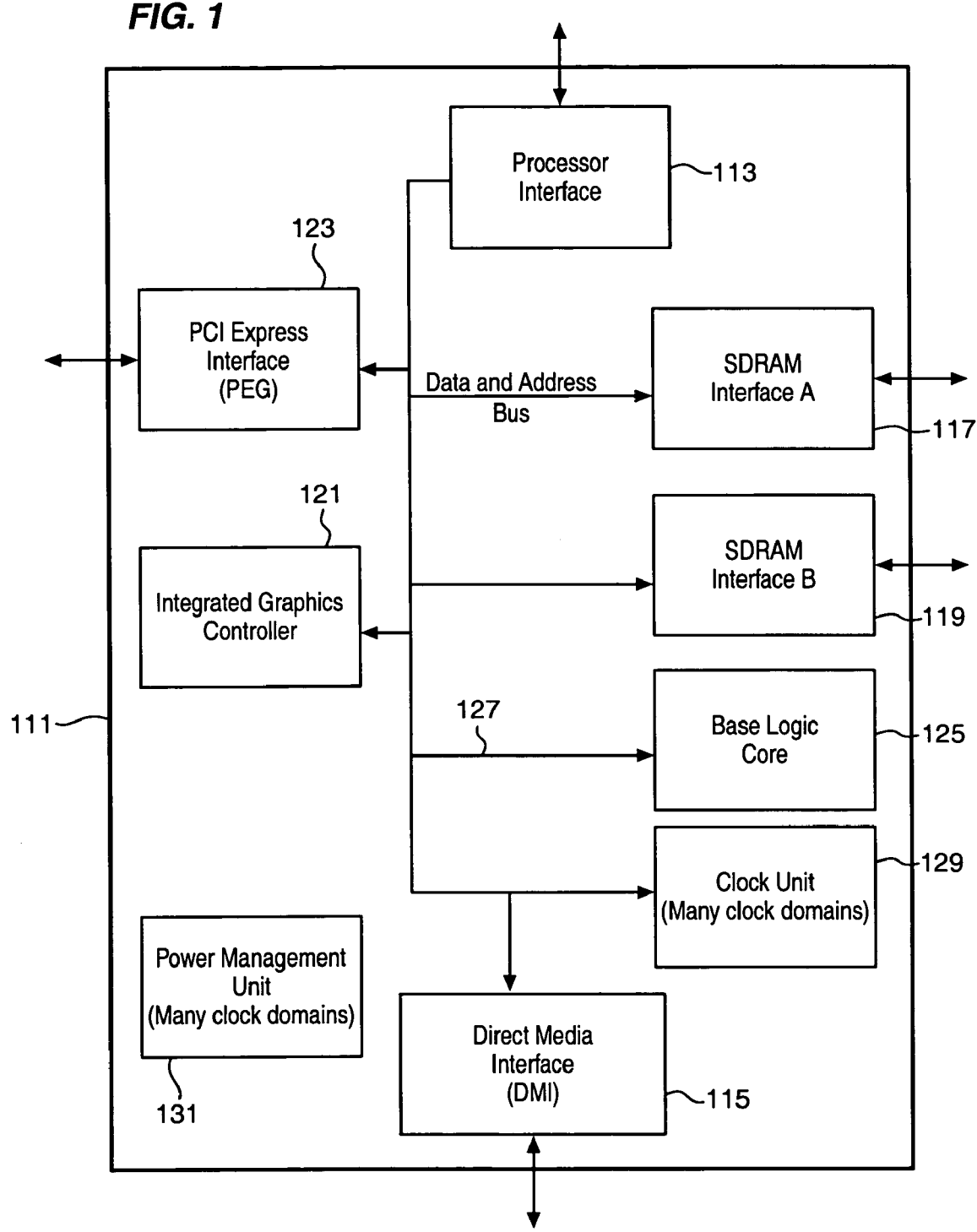
FIG. 1 is a block diagram of an integrated circuit including customizable logic coupled to counters according to an embodiment of the present invention.

FIG. 1 shows an example of an integrated circuit suitable for use with an embodiment of the present invention. In the example of FIG. 1, the integrated circuit is a Memory Controller Hub (MCH) chip. The MCH chip together with an ICH (I/O controller hub), functions as a supporting chipset for a CPU. Any number of different CPU's and chipsets may be used. In one embodiment, an Intel® Pentium® 4 processor with an Intel® 865 or 875 MCH chipset is used, however embodiments of the invention are not so limited. The MCH chip 111 includes several interfaces to external devices. These include an interface 113 to the processor and a north bridge interface 115 or direct media interface (DMI) coupled to an ICH, such as an Intel® ICH6 chip. Note that embodiments of the invention are not limited to the particular choice of processors and supporting chips suggested herein.

The MCH chipset has an SDRAM interface A 117 and SDRAM interface B 119 coupled to on-board memory, such as SDRAM (Dynamic Random Access Memory). This memory may take many different forms. In one example, the memory is dual channel DDR (Double Data Rate) memory mounted in DIMM (Dual Inline Memory Module) packages on a motherboard that carries the CPU, MCH and ICH. The chipset may also have an integrated graphics controller 121 to provide on-board graphics capabilities and an AGP (Accelerated Graphics Port), PCI Express Graphics Interface (PEG) 123 or other external graphics interface to couple with any of a variety of different external graphics devices. These particular interfaces are provided as examples only. An MCH chip may have more or fewer or different interfaces than those shown and ICs with other types of interfaces may also benefit from embodiments of the present invention.

The MCH chip also includes a base logic core 125 coupled to each of the interfaces mentioned above by a data and address bus 127 to perform the basic processing on the chip and to control all the interfaces. The data and address bus also transfers data from the external memory to all of the internal controllers and other interfaces A clock unit con trolled by the base logic core provides timing for all of the components of the chipset and a power management unit provides appropriate voltages to each of the interfaces and related devices.

The SDRAM interfaces 117, 119 control addressing and data access for the external on-board memory. The memory is mapped to addresses using some kind of interleaving. Interleaving is used to improve memory performance. Memory interleaving increases bandwidth by allowing simultaneous access to more than one chunk of memory so that the processor can transfer more information to and from memory in the same amount of time.

Figure 2:
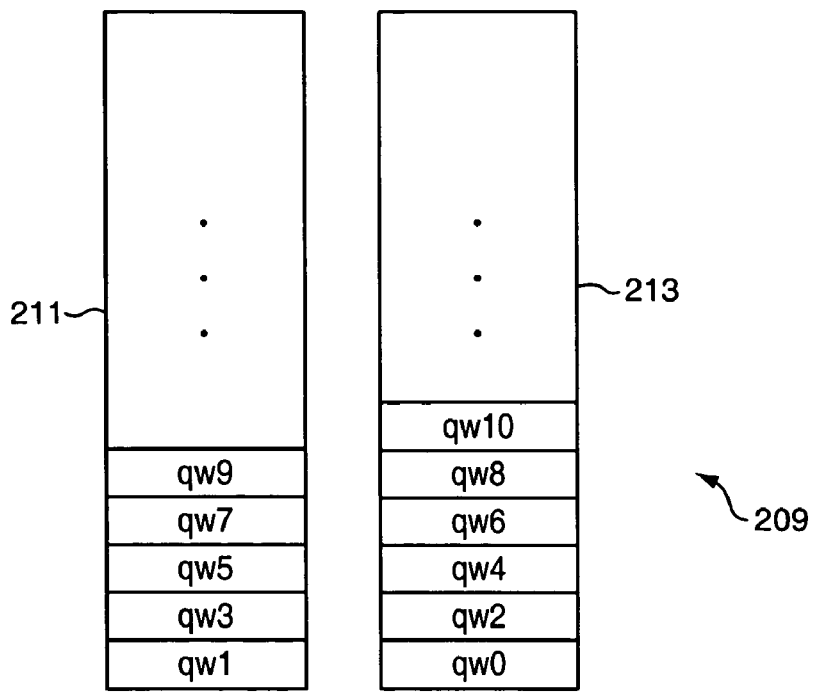
FIG. 2 is a diagram of memory addressing for CPU optimization.

As shown in FIG. 2, the interleaving may be done by dividing the system memory into multiple blocks, typically two blocks for two-way interleaving or four blocks for four-way interleaving. Each block of memory is accessed using different sets of control lines, which are merged together on the memory bus. When a read or write is begun to one block, a read or write to the other interleaved blocks can be overlapped with the first one. Typically, to enhance CPU performance, consecutive memory addresses are spread over the different blocks of memory. In other words, if there are four blocks of interleaved memory, the system doesn't fill the first block, and then the second and so on. It uses all four blocks, spreading the memory around so that the interleaving can be exploited. With DDR memory, a quadword can be obtained in one-half a clock cycle. Two quadwords can be obtained on each of the two channels in a single clock cycle.

FIG. 2 depicts the organization of blocks as quadwords in a typical dual channel memory interface. The diagram of FIG. 2 represents a memory map that can be contained within a memory interface. However, it can also be considered as a diagram of quadwords stored in a set of memory registers. With such a memory configuration, each memory channel is a quadword (QW) wide. A quadword is four words and a word is two bytes, so a quadword is eight consecutive bytes of data. The memory channel, between one of the memory interfaces and an external SDRAM DIMM is accordingly eight bytes or 64 bits wide.

Typically, as an agent reads or writes, walking through memory 209, it alternates from one channel, channel A 211, to the other channel, channel B 213. So, as shown in FIG. 2 for example, QW0 is from channel A and QW1 is from channel B. QW2 is from channel A and QW3 is from channel B. This alternating memory map optimizes memory access speed for a connected CPU because it minimizes the effects of delays within the SDRAM modules. It also provides the quadwords in an order that is typically the best order for the CPU. QWs 0 and 1 are fetched first and these are typically the first quadwords that the CPU wants.

Figure 3:
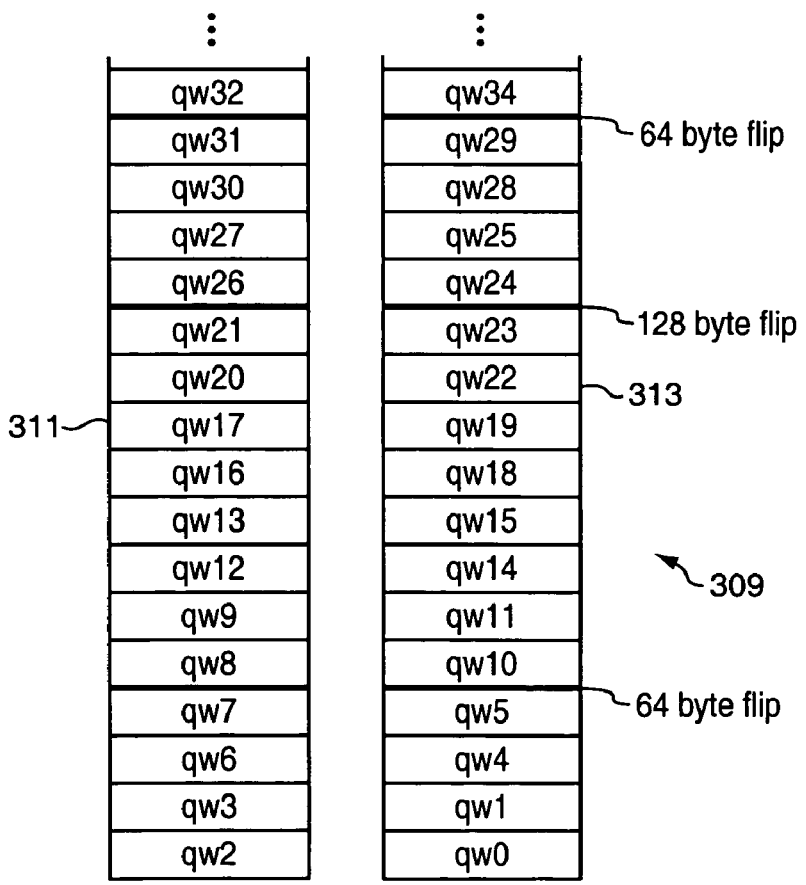
FIG. 3 is a diagram of memory addressing for graphics optimization according to an embodiment of the present invention.

FIG. 3 depicts an alternative organization of quadwords in a dual channel memory interface. The organization has been optimized for a particular application. In this case, an internal graphics controller 121. With this example of graphics optimized organization, pairs of QWs are interleaved across channels. So, for example, QW0 and QW1 are in channel A 311 while QW2 and QW3 are in channel B 313. Note also that with this optimized organization, channels are switched every two QWs but the mapping is flipped after 8 QWs. So, for example, QW6 and QW7 are in channel B and QW8 and QW9 are also in channel B.

As a result, if the graphics controller requests QW0 and QW1 concurrently with QW8 and QW9, QW8 and QW9 will be in the other channel. QW8 and QW9 is the pair of QWs 64 bytes away from QW1 and QW2. This is a common request sequence in graphics applications. The flipping allows the two pairs of quadwords to be accessed at virtually the same time. The channels are flipped again after 128 bytes or 16 quadwords. The channels are then flipped after the next 64 bytes or 8 quadwords. This 256 MB flipping structure of 64, 128, 64 is repeated throughout the memory map. This organization allows the graphics controller to access any pair of QWs together with another pair of QWs which are 64, 128 or 256, etc. bytes away simultaneously using different channels.

The graphics controller shares a portion of system memory for geometry, advanced textures, frame buffer and other graphics related activities. As users interact with 3D objects, the graphics controller quickly access the system memory, transfers the geometry data to its local memory and starts the computation of creating the new geometry data. The new geometry data is then placed back into system memory for the graphics controller to access. Having a high bandwidth, fast access to system memory from the CPU and the graphics controller becomes an important factor for high performing games and 3D modeling applications. Additionally, the graphics controller uses a portion of system memory as its frame buffer memory for high resolution video editing and playback. By mapping the dual channel DDR memory for faster access by the graphics controller, users benefit from improved frame rates and higher quality in high-resolution motion video playback.

The alternate memory mapping will have little, if any, effect on CPU speed for several reasons. First, the CPU will typically have a cache that allows it to buffer its memory accesses. Data will often be requested in advance of when it is required so that even with an increase in clock cycles, the CPU will already have the required data in cache. Second, the CPU will often request an access of four sequential quadwords. If, for example, QW0, QW1, QW2, and QW3 are requested, then, using the memory map of FIG. 3, QW0 and QW2 can be obtained simultaneously on the same bus with QW1 and QW3. If these four sequential and simultaneous quadwords are reordered, before being supplied to the CPU cache, then they can be provided as quickly as with the memory map of FIG. 2.

The memory mapping approach described herein may be applied to optimize memory for any other memory intensive device. While the graphics controller example is particularly appropriate for an integrated graphics processor in a personal computer environment, other types of equipment may host different memory intensive processes. The graphics controller example herein is provided only as an example of one embodiment.

Notwithstanding the minimal effect on CPU usage, the memory mapping described above may be made optional. For some applications, the CPU may require frequent and substantial memory accesses. Such applications may experience a net reduction in performance by using the graphics specific memory mapping described above. In other applications, an internal or external graphics controller with a substantial memory cache, may not experience a significant performance benefit from the graphics oriented memory mapping described above. In the example of FIG. 1, the PEG interface may be used to interface with an external graphics controller. In the form, for example, of an external video adapter card. Such cards typically have from 32 MB to 256 MB or more of memory separate and apart from the system memory accessed by the memory interfaces and may not be significantly aided by the graphics oriented memory mapping.

In order to optimize the memory mapping for different applications and hardware configurations, a configuration setting can be used. In one embodiment, this is a configuration bit that can be set by the BIOS (Basic Input Output System) software. When a system is booting up, the BIOS can check the graphics hardware configuration. If an external graphics processor is connected, then a CPU specific memory map can be invoked. If internal graphics using system memory is detected, then a graphics specific memory mode can be invoked. The configuration setting may also be a user settable parameter. A user may be allowed to select CPU or graphics optimization based on preferences or intended use.

Figure 4:
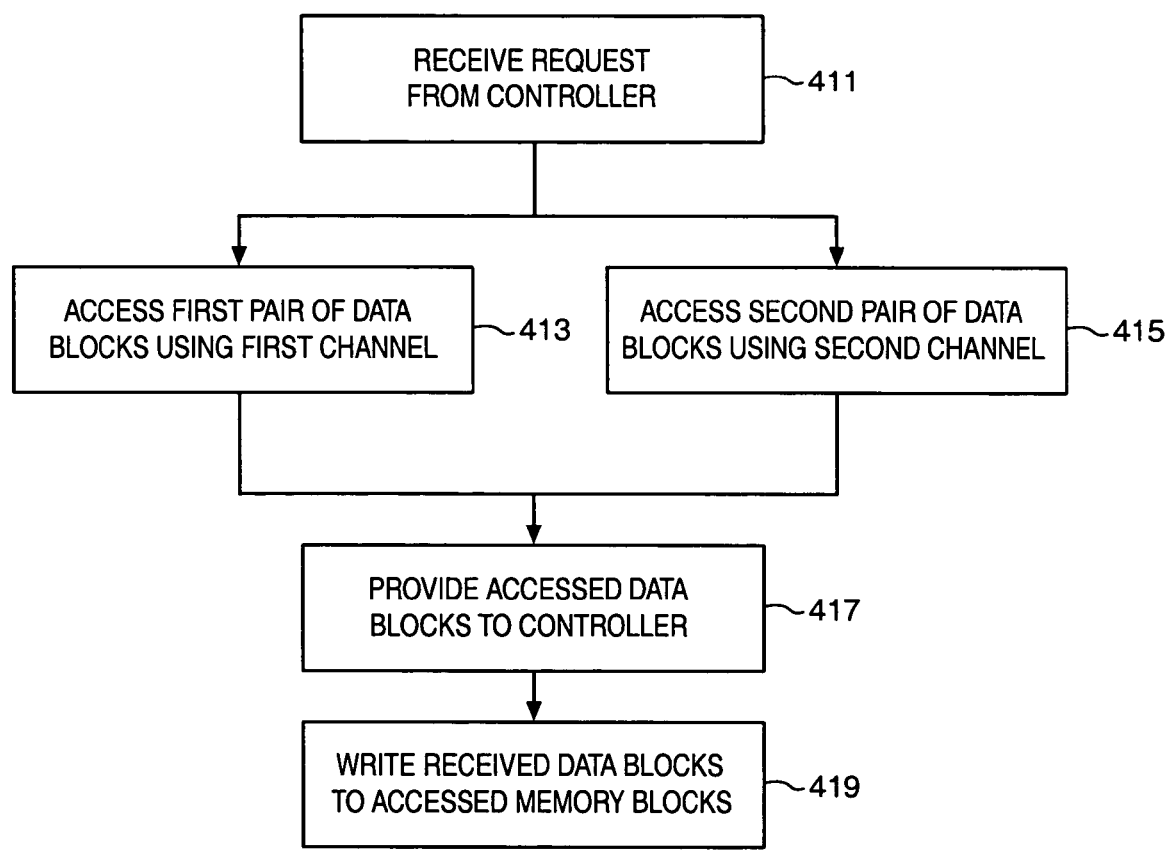
FIG. 4 is a flow diagram of accessing a memory using an optimized map according to one embodiment of the present invention.

In operation, the memory map of FIG. 3 allows very quick access to memory blocks in a format that is generally preferred for many graphics controllers. FIG. 4 shows a process flow for accessing memory. In FIG. 4, at block 411, a memory interface, such as one of the memory interfaces 117, 119 of FIG. 1 receives a request for access from the graphics controller or from another device for which the memory map has been optimized. The memory interface at block 413 accesses a first pair of nonadjacent data blocks using a first channel of the memory device. In one embodiment, this memory device is a dual channel DDR DIMM. The two nonadjacent blocks might be blocks 0 and 1 as shown in FIG. 3. They are nonadjacent in numerical sequence but due to the memory map can be accessed in a single request.

Simultaneously, at block 415, the memory interface accesses a second pair of nonadjacent data blocks using a second channel of the memory device. This second pair is spaced apart from the first pair by some predetermined interval. The interval is selected to correspond to the requirements of the graphics controller. For many graphics controllers available today, the optimal interval is 64 bytes. So, for example, in FIG. 3 in which each data block contains 8 bytes, and the first pair consists of blocks 0 and 1, the second pair of blocks consists of data blocks 8 and 9. The pairs of data blocks switch channels within the map every 64 bytes. 64 corresponding to eight quadwords of eight bytes each. In this way, as long as the accessed pairs are separated by 64 bytes, 128 bytes or 256 bytes, the accessed pairs will be available in different channels.

In block 417, the accessed data blocks are provided to the graphics controller. This is done in accordance with the request of block 411. As an alternative, the request of block 411 includes data to be written to the memory. In this case, shown in block 419, the memory interface writes the received data blocks to the accessed blocks of the memory device.

Figure 5:
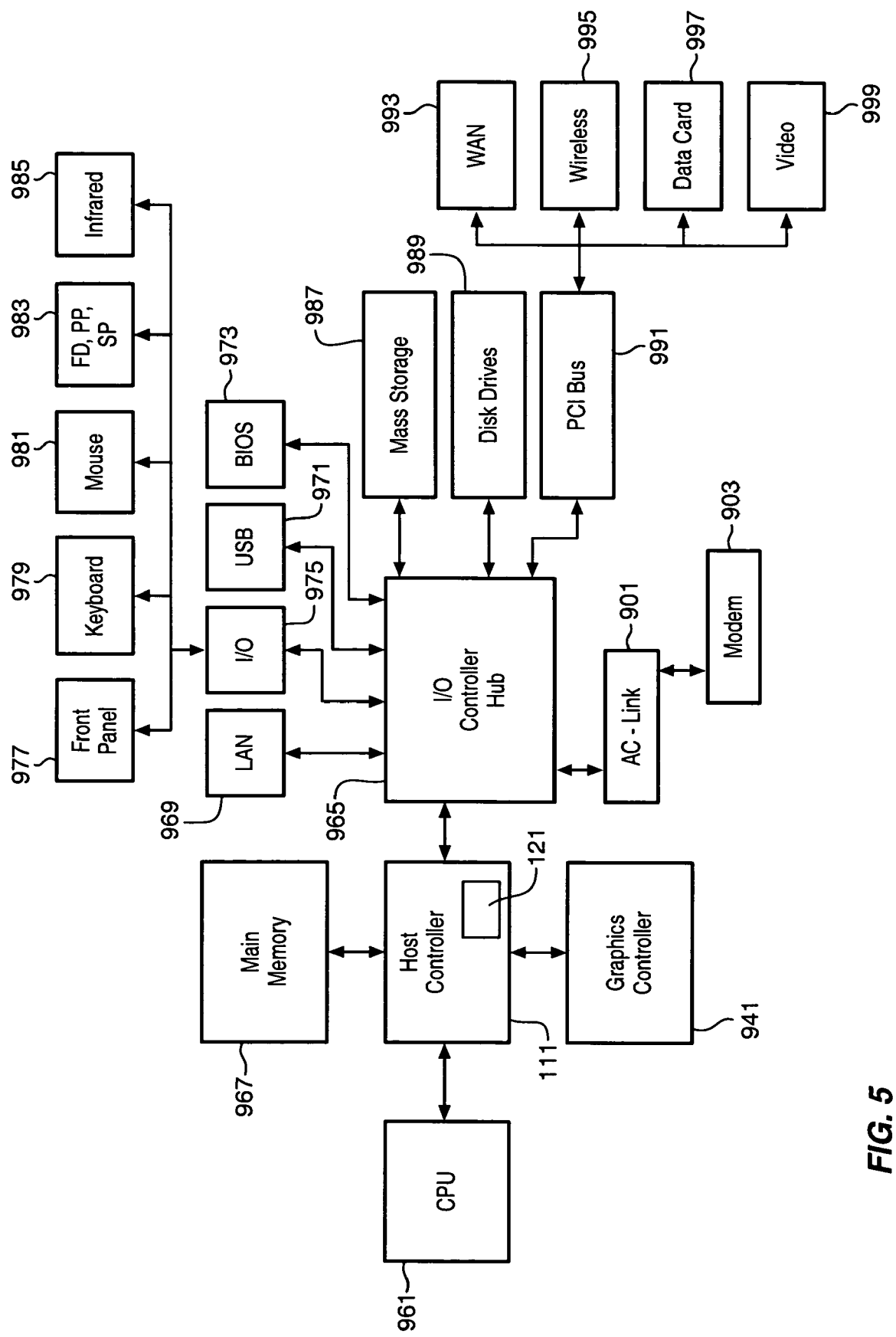
FIG. 5 is a block diagram of a computing system suitable for implementing an embodiment of the present invention.

FIG. 5 shows a computer system suitable for use with the MCH chip described above. While embodiments of the present invention can be adapted for application on a great number of different ICs, the present example is described in the context of a chipset that supports a microprocessor. In this example, the computer system may include a CPU (Central Processing Unit) 961 coupled to a chipset component 111 of the type described herein, i.e. a Memory Controller Hub (MCH) chip. The MCH chip functions as part of a supporting chipset for the CPU. The MCH chip is coupled to main memory 967, such as DRAM and, optionally, to a graphics controller 941, using interfaces shown, for example, in FIG. 1.

The MCH chip 111 is also coupled to an ICH (Input/Output controller hub) chip 965. The ICH chip offers connectivity to a wide range of different devices. Well-established conventions and protocols may be used for these connections. The connections may include a LAN (Local Area Network) port 969, a USB hub 971, and a local BIOS (Basic Input/Output System) flash memory 973. A SIO (Super Input/Output) port 975 may provide connectivity for a front panel 977 with buttons and a display, a keyboard 979, a mouse 981, and infrared devices 985, such as remote control sensors. The I/O port may also support floppy disk, parallel port, and serial port connections. Alternatively, any one or more of these devices may be supported from a USB, PCI or any other type of bus. The MCH chip may also contain in integrated graphics controller 121 as described above.

The ICH may also provide an IDE (Integrated Device Electronics) bus for connections to disk drives 987, 989 or other large memory devices. The mass storage may include hard disk drives and optical drives. So, for example, software programs, user data, and data files may be stored on a hard disk drive or other drive. In addition CD's (Compact Disk), DVD's (Digital Versatile Disk) and other storage media may be played on drives coupled to the IDE bus.

A PCI (Peripheral Component Interconnect) bus 991 is coupled to the ICH and allows a wide range of devices and ports to be coupled to the ICH. The examples in FIG. 5 include a WAN (Wide Area Network) port 993, a Wireless port 995, a data card connector 997, and a video adapter card 999. There are many more devices available for connection to a PCI port and many more possible functions. The PCI devices may allow for connections to local equipment, such as cameras, memory cards, telephones, PDA's (Personal Digital Assistant), or nearby computers. They may also allow for connection to various peripherals, such as printers, scanners, recorders, displays and more. They may also allow for wired or wireless connections to more remote equipment or any of a number of different interfaces. The remote equipment may allow for communication of programming data, for maintenance or remote control or for gaming, Internet surfing or other capabilities.

Finally, the ICH is shown with an AC-Link (Audio Codec Link) 901, a digital link that supports codecs with independent functions for audio and modem. In the audio section, microphone input and left and right audio channels are supported. In the example of FIG. 9, the AC-Link supports a modem 903 for connection to the PSTN. As can be seen from FIG. 9, the architecture of FIG. 9 allows for a wide range of different functions and capabilities. The particular design will depend on the particular application.

It is to be appreciated that a lesser or more equipped memory map, chip, and computer system than the examples described above may be preferred for certain implementations. Therefore, the configurations may vary from implementation to implementation depending upon numerous factors, such as price constraints, performance requirements, technological improvements, or other circumstances. Embodiments of the invention may also be applied to other types of software-driven systems that use different hardware architectures than that shown in the Figures.

In the description above, for purposes of explanation, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention may include various operations. The operations of embodiments of the present invention may be performed by hardware components, such as those shown in the Figures, or may be embodied in machine-executable instructions, which may be used to cause general-purpose or special-purpose processor or logic circuits programmed with the instructions to perform the operations. Alternatively, the operations may be performed by a combination of hardware and software.

Embodiments of the present invention may be provided as a computer program product which may include a machine-readable medium having stored thereon instructions which may be used to program a computer system (or other electronic devices) to perform a process according to embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but operations may be added to or deleted from any of the methods and components may be added or subtracted from any of the described apparatus without departing from the basic scope of the present claims. It will be apparent to those skilled in the art that many further modifications and adaptations may be made. The particular embodiments are not provided as limitations but as illustrations. The scope of the claims is not to be determined by the specific examples provided above but only by the claims below.

What is claimed is:

1. A memory map for interleaved memory comprising:
   a first channel having a data channel width and having a first sequence of pairs of consecutive data blocks, each data block having the same number of bits as the width of the data channel; and
   a second channel having the same data channel width as the first channel and having a second sequence of pairs of consecutive data blocks, the pairs of the first sequence having the same number of bits as the pairs in the second sequence and alternating in sequential order with the pairs of the second sequence.

2. The memory map of claim 1, wherein the first sequence of pairs consists of odd pairs and the second sequence consists of even pairs.

3. The memory map of claim 1, wherein the data blocks are numbered sequentially, wherein the first sequence of pairs comprises a pair of blocks 0,1 and a pair of blocks 4 and 5, and wherein the second sequence of pairs comprises a pair of blocks 2 and 3 and a pair of blocks 6 and 7.

4. The memory map of claim 1, wherein the first and second sequences of pairs have a transition interval and wherein after each occurrence of the interval the first and second sequences reverse order.

5. The memory map of claim 4, wherein the first sequence of pairs consists of odd pairs before the first transition point and the second sequence consists of even pairs, and wherein the first sequence consists of even pairs after the first transition interval and before a second transition interval, and wherein the second sequence consists of odd pairs after the first transition interval and before the second transition interval.

6. The memory map of claim 4, wherein the first and second sequences are chosen to optimize memory access speed by a selected controller.

7. The memory map of claim 6, wherein the controller is a graphics processor.

8. The memory map of claim 1, wherein the adjacent data blocks of the first pair have adjacent address values.

9. The memory map of claim 1, wherein the data blocks each consist of a fixed number of bytes and the first block of the first pair is spaced apart from the first block of the second block by eight times the fixed number.

10. The memory map of claim 1, wherein the interleaved memory is a double data rate memory device.

11. The memory map of claim 1, wherein the data blocks are accessible to a graphics controller.

12. The memory map of claim 1, wherein data is written into the memory from a graphics controller.

13. The memory map of claim 1, wherein the first and second sequence of pairs are simultaneously accessible.

14. A computer system comprising:
   a graphics controller;
   a dual channel memory, each channel having a data channel width corresponding to a number of bits;
   a central processing unit; and
   a memory controller coupled by a bus to the CPU, the dual channel memory and the graphics controller, the memory controller having a memory map to the first channel of the dual channel memory having a first sequence of pairs of consecutive data blocks, and memory map to the second channel of the dual channel memory having a second sequence of pairs of consecutive data blocks, the pairs of the first sequence alternating in sequential order with the pairs of the second sequence, each data block having the same number of bits as the data channel width.

15. The system of claim 14, wherein the first and second sequences of pairs have a transition interval and wherein after each occurrence of the interval the first and second sequences reverse order.

16. The system of claim 14, wherein the first sequence of pairs consists of odd pairs before the first transition point and the second sequence consists of even pairs, and wherein the first sequence consists of even pairs after the first transition interval and before a second transition interval, and wherein the second sequence consists of odd pairs after the first transition interval and before the second transition interval.

17. The system of claim 14, wherein the memory controller:
   maps a first pair of data blocks to a first channel of a dual channel memory;
   maps a second pair of data blocks to a second channel of the dual channel memory;
   maps a third pair of data blocks to the first channel of the dual channel memory;
   maps a fourth pair of data blocks to the second channel of the dual channel memory;
   maps a fifth pair of data blocks to the second channel of the dual channel memory; and
   maps a sixth pair of data blocks to the first channel of the dual channel memory.

18. The system of claim 17, wherein the data blocks each comprise a quadword.

19. The system of claim 18, wherein each pair of data blocks consists of two sequential quadwords.

20. The system of claim 19, wherein the first, second, third and fourth pairs combined contain of 64 bytes.

21. The system of claim 14, wherein the memory controller detects devices coupled to a memory controller, selects a primary device from among the detected devices for memory access, and selects a system memory memory map to optimize system memory operation with the selected device.

22. The system of claim 21, wherein detecting devices comprises detecting the CPU and the graphics controller.

23. The system of claim 21, wherein selecting a primary device comprises determining a memory configuration for the graphics controller.

24. The system of claim 21, wherein selecting a primary device comprises selecting the CPU if the graphics controller includes internal memory and selecting the graphics controller if the graphics controller uses system memory.

25. The system of claim 21, wherein selecting a memory map comprises selecting a system memory map to optimize graphics memory access if the graphics controller is selected.

* * * * *